(12) United States Patent
Sathyanarayana et al.

(10) Patent No.: US 12,038,314 B2
(45) Date of Patent: Jul. 16, 2024

(54) ULTRASONIC TRANSDUCER SYSTEM AND METHOD USING BROADBAND SYSTEM RESPONSES

(71) Applicant: TEXAS INSTRUMENTS INCORPORATED, Dallas, TX (US)

(72) Inventors: Amardeep Sathyanarayana, Austin, TX (US); David P. Magee, Allen, TX (US); Anand G. Dabak, Plano, TX (US); Srinath M. Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/563,227

(22) Filed: Dec. 28, 2021

(65) Prior Publication Data

US 2022/0120596 A1 Apr. 21, 2022

Related U.S. Application Data

(62) Division of application No. 15/236,650, filed on Aug. 15, 2016, now Pat. No. 11,209,297.

(60) Provisional application No. 62/244,413, filed on Oct. 21, 2015.

(51) Int. Cl.
*G01S 15/10* (2006.01)
*G01F 1/667* (2022.01)

(52) U.S. Cl.
CPC ............ *G01F 1/667* (2013.01); *G01S 15/104* (2013.01); *G01S 15/107* (2013.01)

(58) Field of Classification Search
None
See application file for complete search history.

(56) References Cited

U.S. PATENT DOCUMENTS

| | | | |
|---|---|---|---|
| 3,568,142 A | | 3/1971 | Landrum, Jr. et al. |
| 3,589,196 A | * | 6/1971 | Van Dyck ............. G01S 15/101 367/908 |
| 3,614,719 A | * | 10/1971 | Treacy ................ G01S 7/52004 367/101 |
| 4,004,267 A | | 1/1977 | Mayne |
| 4,322,974 A | * | 4/1982 | Abele ................. G01S 15/8977 73/602 |
| 2002/0083771 A1 | | 7/2002 | Khuri-Yakub et al. |
| 2004/0039283 A1 | * | 2/2004 | Banjanin ............. G01S 7/52047 600/437 |

(Continued)

FOREIGN PATENT DOCUMENTS

| | | |
|---|---|---|
| CN | 1387026 A | 12/2002 |
| CN | 101162164 A | 4/2008 |

(Continued)

OTHER PUBLICATIONS

Shengwei et al, "Research on Ultrasonic Distance Measurement Based on FSK", Electronic Measurement Technology, pp. 150-152, vol. 32, No. 5, May 2009.

*Primary Examiner* — Hovhannes Baghdasaryan
(74) *Attorney, Agent, or Firm* — Mandy Barsilai Fernandez; Frank D. Cimino (57) ABSTRACT

A transducer system with a transducer and circuitry for applying a waveform to excite the transducer during an excitation period. The applying circuitry also comprises circuitry for changing a frequency of the waveform during the excitation period.

22 Claims, 7 Drawing Sheets

(56) References Cited

U.S. PATENT DOCUMENTS

| | | | |
|---|---|---|---|
| 2004/0177693 A1* | 9/2004 | Tenoudji | G01P 5/001 73/605 |
| 2006/0158956 A1 | 7/2006 | Laugham, Jr. et al. | |
| 2010/0085836 A1 | 4/2010 | Bagaini et al. | |
| 2010/0268503 A1 | 10/2010 | Specht et al. | |
| 2011/0261652 A1* | 10/2011 | Horsky | B06B 1/0253 73/579 |
| 2012/0313900 A1 | 12/2012 | Dahl | |
| 2013/0203083 A1 | 8/2013 | Connors et al. | |
| 2014/0230556 A1 | 8/2014 | Yamamoto et al. | |

FOREIGN PATENT DOCUMENTS

| | | |
|---|---|---|
| CN | 101334472 A | 12/2008 |
| CN | 204486182 U | 7/2015 |
| WO | 2014139260 A1 | 9/2014 |

\* cited by examiner

ULTRASONIC TRANSDUCER SYSTEM AND METHOD USING BROADBAND SYSTEM RESPONSES

CROSS-REFERENCES TO RELATED APPLICATIONS

This application is a division of U.S. patent application Ser. No. 15/236,650, filed Aug. 15, 2016, which claims priority to and the benefit of the filing date of U.S. Provisional Patent Application 62/244,413, filed Oct. 21, 2015, each of which is incorporated by reference in its entirety.

STATEMENT REGARDING FEDERALLY SPONSORED RESEARCH OR DEVELOPMENT

Not Applicable.

BACKGROUND OF THE INVENTION

The preferred embodiments relate to ultrasonic transducers and more particularly to a system and method using broadband excitation pulse frequencies for such transducers.

Ultrasound transducers are known in the art for transmitting ultrasound waves and detecting a reflection or echo of the transmitted wave. Such devices are also sometimes referred to as ultrasound or ultrasonic transducers or transceivers. Ultrasound transducers have myriad uses, including water and gas flow meters, consumer devices, vehicle safety, and medical diagnostics. In these and other fields, signals detected by the transducer may be processed to determine distance, which may be further combined with directional or area processing to determine flow, volume, shape, as well as aspects in connection with two and three dimensional processing, including image processing.

Flow meters (e.g., water or gas) are implemented in various schemes in the prior art, including mechanical, electromagnetic, and ultrasonics. The prior art for such meters includes a system having two ultrasonic transducers oriented to communicate signals between one another, with the signal traversing a channel inside a pipe. Generally an applied pulse (or series of pulses) excites a first of the two transducers, which generates a waveform that is received by a second of the transducers, after a certain amount of time which is measured as a first time-of-flight (TOF). The process is then reversed, whereby a pulse or pulses is applied to the second transducer, causing a waveform to be received by the first transducer, with a second TOF measured in this reversed process. The first and second TOF, and the differential TOF, determine speed of flow of the propagation medium between the transducers (and hence, along the medium in which the transducers are located). For precision purposes, however, accuracy in determining TOF may be of utmost importance, while at the same time balancing efficiency considerations in achieving a desirable accuracy are also typically an important consideration.

Accurately measuring TOF relies on numerous factors, including a sufficiently energized and detected waveform in each of the two directions during the TOF measures. Toward this end, it is known in the art that the transducer system has a resonant frequency, and accuracy is improved by exciting the transducer system near or at this resonant frequency, which is typically within a fairly narrow bandwidth. A key difficulty arises, however, in that the resonant frequency may be unknown or changing. For example, the system resonant frequency can become altered based on propagation medium temperature, impurities or composition, sedimentation, deposition or aging of the transducers, and transducer variability as between different manufacturers or even from the same manufacturer. Moreover, once the flowmeter is deployed in the field, it becomes increasing difficult to constantly monitor these changes and adjust the excitation pulse frequency. Further, setting a static excitation frequency for each individual system during initial manufacture may be cost-prohibitive and not necessarily reliable once the system is deployed in the field, after which the system resonant frequency can temporarily or permanently change, in which case a static factory setting may no longer optimally generate a resonant echo and accurate TOF determination.

Given the preceding discussion, the present inventors seek to improve upon the prior art, as further detailed below.

BRIEF SUMMARY OF THE INVENTION

In a preferred embodiment, there is a transducer system. The system comprises a transducer and circuitry for applying a waveform to excite the transducer during an excitation period. The applying circuitry also comprises circuitry for changing a frequency of the waveform during the excitation period.

Numerous other inventive aspects are also disclosed and claimed.

DETAILED DESCRIPTION OF EMBODIMENTS

Figure 1:
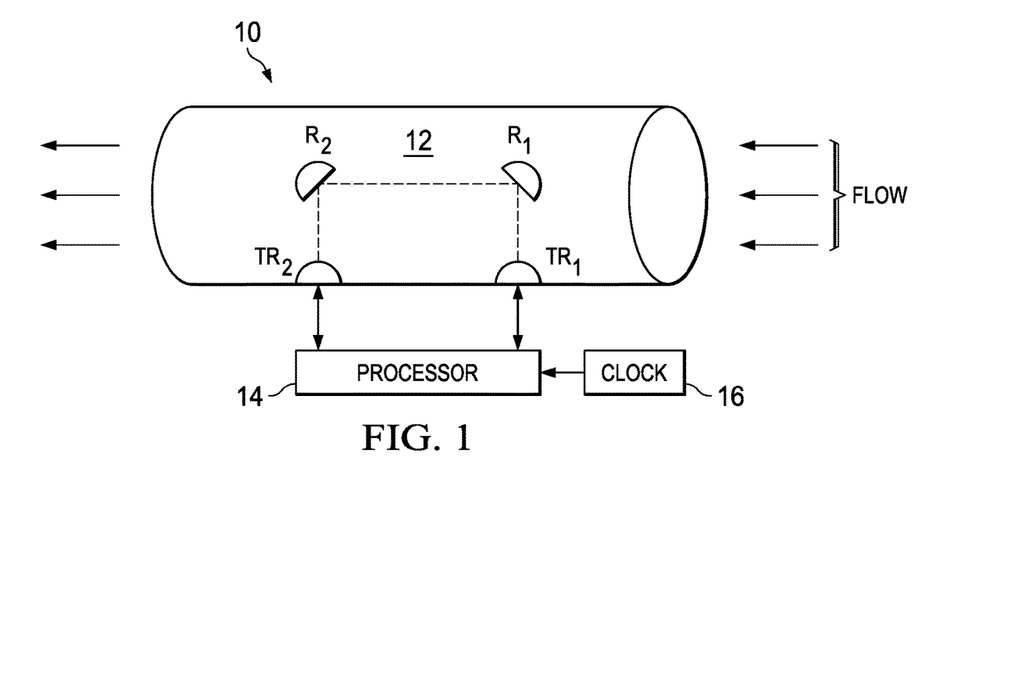
FIG. 1 illustrates a diagram of a flow meter transducer system.

FIG. 1 illustrates a diagram of a flow meter transducer system 10. System 10 as described in this initial paragraph is known in the art, but it also is included and improved upon in connection with the preferred embodiments as detailed hereafter. System 10 includes a pipe 12 through which a material, such as water or gas, may flow, and for sake of reference in FIG. 1 the flow direction is shown from right to left. Within pipe 12 are located a first transducer $TR_1$ and a second transducer $TR_2$. Proximate transducer $TR_1$ is a reflector $R_1$, and proximate transducer $TR_2$ is a reflector $R_2$. Each reflector $R_x$ is oriented so as to communicate a signal with its respective proximate transducer $TR_x$ and also to communicate a signal to the other reflector. As shown by a dashed line inside pipe 12 in FIG. 1, therefore, transducer $TR_1$ communicates a signal to reflector $R_1$, which reflects that signal to reflector $R_2$, which reflects that signal to transducer $TR_2$. Likewise, transducer $TR_2$ communicates a signal to reflector $R_2$, which reflects that signal to reflector $R_1$, which reflects that signal to transducer $TR_1$. Lastly, a processor 14, such as a digital signal processor, microprocessor, microcontroller, or some other electronic circuitry, receives a clock signal from a clock 16, and processor 14 is coupled to both transducer $TR_1$ and transducer $TR_2$ for exciting either transducer $TR_x$ to transmit a signal and to process a correspondingly received signal by the other transducer, as further explored below. Clock 16 is typically a low-power (e.g., power consumption ~140 µA/MHz) crystal oscillator with speeds in the range of 1-24 MHz.

Figure 2:
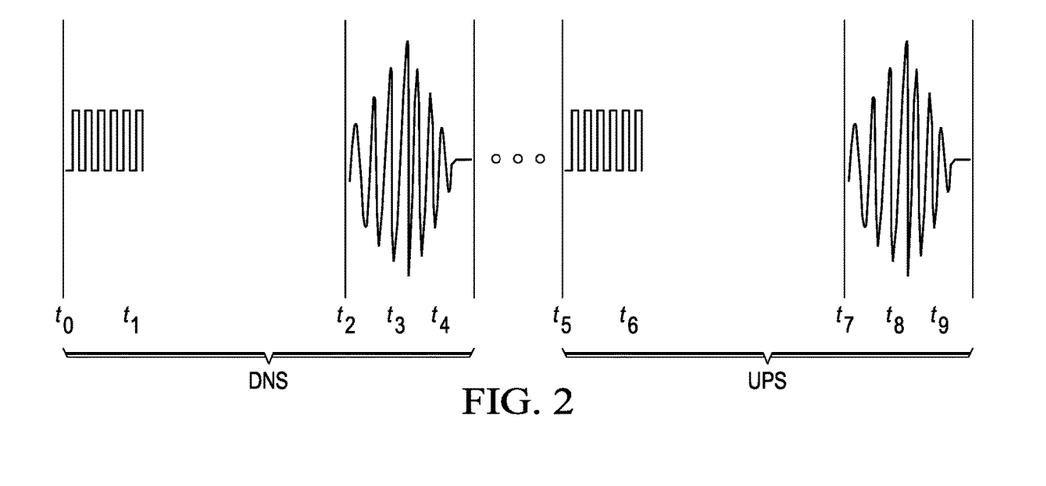
FIG. 2 illustrates a sequence diagram of the excitation and response waveforms of the flow meter transducer system of FIG. 1.

FIG. 2 illustrates a sequence diagram of the flow meter transducer system 10 of FIG. 1, where the sequence as illustrated and first described is also known in the art, but it also is included and improved upon in connection with the preferred embodiments as detailed hereafter. In general, FIG. 2 represents a first transmission in a first direction from first transducer $TR_1$ to second transducer $TR_2$, followed by a second transmission in second direction, opposite the first, from second transducer $TR_2$ to first transducer $TR_1$. For sake of reference, the first direction is shown and referred to as downstream (DNS) in the context of pipe 12 in FIG. 1, and the second direction is shown and referred to as upstream (UPS) in the context of pipe 12 in FIG. 1.

Looking at the DNS timeline, at a time $t_0$, processor 14, either directly or via additional circuitry (not shown), applies an excitation pulse train to transducer $TR_1$ which in response transmits a corresponding ultrasonic pulse train signal, where both the applied and transmitted pulse trains consist of a number of pulses, such as 10 to 40 such pulses, shown beginning therefore at time $t_0$ and ending at time $t_1$. The transmitted pulses are directed to reflector $R_1$, which reflects them to reflector $R_2$, toward transducer $TR_2$. Time passes as these signals pass along a channel that includes the portion of the interior of pipe 12, and any material inside that pipe, that is generally along the dashed line shown in FIG. 1. This time is referred to in the art as time of flight (TOF). Thus, the DNS TOF occurs between times $t_0$ and $t_2$, or it may be measured relative to some known offset from either of those times.

At time $t_2$, second transducer $TR_2$ begins to respond to the pulses transmitted by first transducer $TR_1$, as shown by the received signal that begins at time $t_2$. Processor 14, being coupled to second transducer $TR_2$, is operable to sample this received signal. Toward this end, processor 14 is typically programmed to begin capturing signals from second transducer $TR_2$ at a time slightly before the expected response at time $t_2$. While the received signal is analog, the captured samples are typically in digital form, so included in the sampling is an analog-to-digital (ADC) conversion, either as part of processor 14 or an additional intermediate device (not shown). Moreover, the sampling rate is commonly, but not necessarily, a multiple of (e.g., four or five times) of the pulse frequency $f_{PLS}$ or of the entire pulse train frequency or of the nominal resonance frequency. For each sample, a sample amplitude $S_x$ is stored, and also preferably stored is a corresponding sample time $st_x$ of when the sample was taken. Note that sample time $st_x$ can be an actual time or based on a count of either time or a number of samples (which thereby can represent time based on the sample period). For sake of reference, therefore, each sample may be represented by the data pair of $(S_x, st_x)$. In any event, ideally, the received signal at time $t_2$ will generally increase toward a peak amplitude at time $t_3$ and decay thereafter, as the transmitted pulses create an oscillatory response in, and due to the resistive/inductive/capacitive (RLC) nature of, the receiving transducer $TR_2$.

At time $t_5$, which is preferably some time after the amplitude of the received signal at transducer $TR_2$ has sufficiently declined, processor 14 reverses the communication direction of system 10, such as via a multiplexer (MUX) operation. Thus, at a later time $t_5$, the above process repeats, but in the reverse (i.e., UPS) direction, that is, from second transducer $TR_2$ to first transducer $TR_1$. From the preceding discussion, therefore, one skilled in the art will appreciate that at time $t_5$, processor 14 applies an excitation pulse train at frequency $f_{PLS}$ to second transducer $TR_2$, causing it to commence emission of a corresponding pulse train, where both the excitation and resultant transmission pulse train consist of the same number of pulses (e.g., 10 to 40) as for the DNS pulses and hence through time $t_6$, directed to reflector $R_2$, which reflects them to reflector $R_1$, toward transducer $TR_1$. Following the TOF of these pulses, at time $t_7$, first transducer $TR_1$ begins to respond to the pulses transmitted by first transducer $TR_2$, with the transducer $TR_1$ received signal again detected, converted to digital, and sampled by processor 14, increasing toward a peak amplitude at time $t_8$, and decaying thereafter to a zero or near-zero level by time $t_9$.

Given the timing of FIG. 2, processor 14 is operable (e.g., via appropriate programming) to determine the UPS TOF, the DNS TOF, and the relative difference of the UPS and DNS TOF, using preferred embodiment methodologies detailed later. From these measures, the flow rate through pipe 12 may be calculated, for example, based on the following Equation 1:

$$v = \frac{L}{2} \times \left(\frac{1}{TR_{12}} - \frac{1}{TR_{21}}\right) = \frac{L}{2} \times \left(\frac{TR_{21} - TR_{12}}{TR_{21}TR_{12}}\right) \qquad \text{Equation 1}$$

where,
L is the length of the channel path between first transducer $TR_1$ and second transducer $TR_2$;
$TR_{12}$ is the DNS TOF;
$TR_{21}$ is the UPS TOF; and
v is the velocity of flow.
Note from Equation 1, therefore, that flow velocity is directly related to the DNS and UPS TOF, and the difference between them. Thus, processor 14 may measure a set of UPS and DNS TOF, or multiple sets, and accordingly determine flow velocity based on those measures. Moreover, the accuracy of the TOF measures directly influences the accuracy of the velocity determination.

As would be expected, if flow is in one direction, then the TOF in that direction should be less than the TOF in the opposite direction. Moreover, if there is no flow in pipe 12 (or it is empty), then the UPS and DNS TOF should be equal. Such expectations, however, represent ideal devices and conditions. The present inventors have recognized, however, that various factors will influence these considerations and may cause errors in flow measurement calculations. For example, each of transducers $TR_1$ and $TR_2$ has a nominal resonance frequency, so that nominally each also should be excited at a frequency at or closest to that frequency. However, based on manufacturing variability as well as potential changes over time, the actual resonance frequency of a transducer may depart from its nominal value, thereby creating an impedance mismatch. As a result, exciting one transducer with a signal based on the nominally expected resonant frequency will cause a less than optimal response in the received signal of the other transducer. Aging also may affect each transducer and also the channel in pipe 12, which is necessarily part of the overall bi-directionally analyzed system. For example, sedimentation may form or change, thereby changing the overall system resonance frequency. Once more, therefore, if a non-resonance frequency excitation signal or pulse is transmitted through the system, then the response at the receiving transducer, including its sensitivity to any impedance mismatch between the transmitting and receiving transducer, will be less than optimal and, hence, more prone to measure/detection errors. Other factors affecting resonance can include variability of devices for the same manufacturer or for devices from different manufacturers. Still other factors are the medium through which the waves pass and the temperature to which the system (and particularly the transducers) are exposed. In view of these considerations and others as may be ascertained by one skilled in the art, the preferred embodiments implement additional improvements in system 10, as further explored below.

Figure 3:
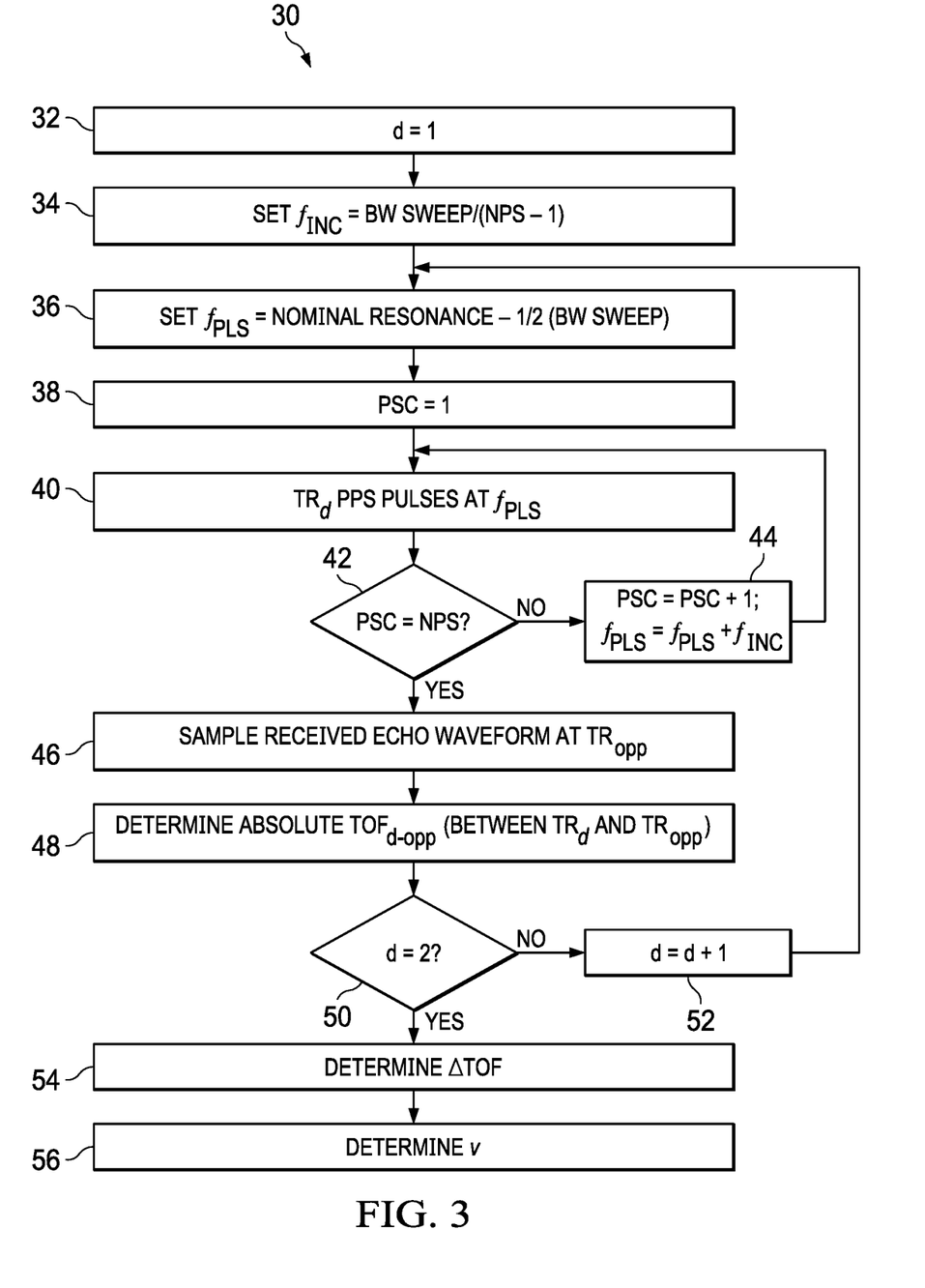
FIG. 3 illustrates a flowchart of a method of operation of the processor of FIG. 1.

FIG. 3 illustrates a flowchart of a method 30 of operation of processor 14 from system 10, as may be implemented with appropriate instructions stored in the processor and/or computing-device readable media, including hardware, firmware, software, or any combination thereof. By way of introduction, method 30 includes an iterative methodology to excite one transducer at a time, where the excitation signal is a pulse waveform having a series of pulses and the pulse frequency is changed (e.g., increased, but alternatively could be decreased). As a first example, the change in pulse frequency is shown and described as a discrete change in frequency at different points in time, aligned with the period of pulses; in an alternative preferred embodiment example provided thereafter, the change in frequency can be continuous. In either event, a pulse train is generated that sweeps across a range of frequencies, and thereafter, an echo waveform is sampled and correlation methodologies are used to determine the DNS TOF, the UPS TOF, and the difference between those TOFs, after which the velocity and volume of flow determination is made from Equation 1. For clarity, such concepts are first introduced in connection with FIG. 3, with additional details and Figures provided thereafter.

Method 30 commences with a step 32, which establishes a direction index d, which as better understood from the remaining discussion will facilitate frequency pulse transmissions for a first direction (i.e., d=1) followed later by frequency pulse transmissions for a second direction. (i.e., d=2). Thus, in step 32, the direction index d is initialized to a value of one. Next, method 30 continues to a step 34.

Step 34 sets an initial value of a frequency increment value $f_{INC}$, where as demonstrated later $f_{INC}$ increases the frequency at which each pulse in a total number of pulse sets NPS is transmitted. Moreover, in general, the entirety of the NPS pulse sets sweeps across broad band range of frequencies, also shown in step 34 as BW SWEEP. Hence, in step 34, $f_{INC}$=BW SWEEP/(NPS-1). For sake of a numeric example, therefore, consider an instance where the total number of pulse sets NPS to be transmitted by a transducer $TR_x$ is 11, with each pulse set having PPS pulses per set (e.g., PPS=4). Consider further that the bandwidth to be swept by the entirety of the NPS=11 pulse sets is 80 kHz. In such a case, then $f_{INC}$=BW SWEEP/(NPS-1)=80 kHz/(11-1)=8 kHz. Next, method 30 continues to step 36.

Step 36 initializes a pulse frequency value $f_{PLS}$, which as shown later indicates a frequency at which each pulse in a pulse set is to be transmitted. Since step 36 is to initialize $f_{PLS}$, where in a preferred embodiment the first (i.e., initialized) value is set at one end of the entire bandwidth through which the total NPS*PPS pulses will sweep. To achieve this setup, step 36 sets $f_{PLS}$ equal to the nominal, or estimated, or approximated frequency resonance of system 10 minus ½ BW SWEEP. As a numeric example, therefore, assume that system 10 is specified (e.g., by manufacturer or empirical testing) to have a nominal, estimated, or approximated resonance frequency of 160 kHz, and recall the example above where BW SWEEP=80 kHz. Thus, in step 36, $f_{PLS}$=160 kHz-½ (80 kHz)=120 kHz. Next, method 30 continues to step 38.

Step 38 initializes a pulse set counter PSC to a value of one. As shown below, the pulse set counter PSC provides an index to cause the successive output of each pulse set, up to the total of NPS pulse sets to be transmitted by a transducer $TR_x$. Next, method 30 continues to step 40.

Figure 4:
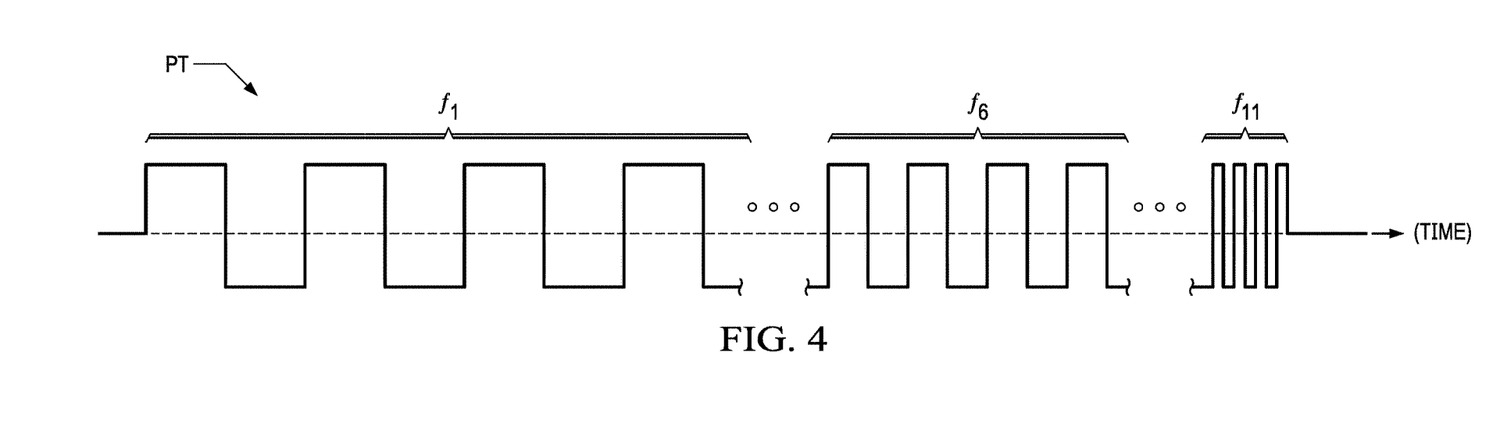
FIG. 4 depicts a sequence of pulses with changing (e.g., increasing) frequencies according to a preferred embodiment.

In step 40, the transducer $TR_d$, meaning the transducer of system 10 with the index d as its subscript, transmits PPS pulses at the frequency $f_{PLS}$. Thus, for the first instance of step 40, that is, where PSC=1, and because step 32 initialized d=1, then transducer $TR_1$ transmits PPS pulses at the pulse frequency $f_{PLS}$ established in step 36. By way of illustration, therefore, FIG. 4 depicts a sequence of pulses, each with a respective frequency of $f_1, f_2, \ldots, f_{11}$, where NPS*PPS (e.g., 11*4=44) pulses are represented given the above exemplary numbers of an implementation of method 30 to transmit a total of 44 pulses. For the first instance of step 40 in method 30, therefore, then transducer $TR_1$ transmits PPS pulses at frequency $f_{PLS}=f_1$. Thus, for the numeric examples given earlier, for this first instance, then $f_1$=120 kHz. Next, method 30 continues to step 42.

In step 42, a condition is evaluated to determine whether the pulse set count PSC equals the total number pulse sets NPS to be transmitted in a given pulse sequence. If step 42 does not find that PSC=NPS, then method 30 continues to step 44, whereas if PSC=NPS, then method 30 continues to step 46.

In step 44, two operations occur to prepare the inner looping portion of method 30 for its next iteration, that is, to facilitate a next successive pulse set transmission at an increased (or decreased) frequency $f_{PLS}$, relative to the pulse frequency from the immediately preceding iteration of the method inner loop. More specifically, step 44 increments the pulse set counter PSC. Additionally, step 44 increases the current frequency $f_{PLS}$ by the incremental value, $f_{INC}$, determined earlier in step 34. Using the numeric examples from above, therefore, recall that $f_{INC}$=8 kHz, and note for the first iteration of the first inner loop of method 30, that $f_{PLS}$=120 kHz. Thus, for the first iteration where step 44 is reached, then the pulse set count PSC is incremented from one to two, and the pulse frequency $f_{PLS}$ in increased from 120 kHz to 128 kHz (i.e., $f_{PLS}=f_{PLS}+f_{INC}$=120 kHz+8 kHz). Following step 44, method 30 returns to a next iteration of step 40, with the immediately-preceding adjustments from step 44. Thus, in step 40, transducer $TR_d$ (e.g., $TR_1$) transmits a next successive pulse set in a sequence of NPS pulse sets, at the now-increased frequency of $f_{PLS}$. Thus, for the second instance of step 40, the second pulse set shown in the time sequence of FIG. 4 is transmitted by transducer $TR_1$, at a frequency of $f_2$, where with the numeric examples given, $f_2$=128 kHz.

From the above, one skilled in the art will appreciate that the method 30 initialization steps and inner loop of steps 40, 42, and 44 perform an iterative methodology so that a first transducer $TR_d$ transmits a total of NPS pulse sets, with each set having PPS pulses at a respective different frequency $f_{PLS}$. Moreover, in the example provided, the respective different frequency $f_{PLS}$ increases linearly among the total NPS pulse sets. The following Table 1 illustrates the entirety of the pulses, again for the example of NOMINAL RESONANCE=160 kHz, and BW SWEEP=80 kHz (and hence, $f_{INC}$=8 kHz).

TABLE 1

| $f_d$ | $f_{PLS}$ |
|---|---|
| $f_1$ | 120 kHz |
| $f_2$ | 128 kHz |
| $f_3$ | 136 kHz |
| $f_4$ | 144 kHz |
| $f_5$ | 152 kHz |
| $f_6$ | 160 kHz |
| $f_7$ | 168 kHz |
| $f_8$ | 176 kHz |
| $f_9$ | 184 kHz |
| $f_{10}$ | 192 kHz |
| $f_{11}$ | 200 kHZ |

Table 1, therefore, summarizes a general pattern of the linear increase of each pulse set relative to the pulse set(s) either/or preceding or following it, so that the entirety of the NPS pulse sets sweep across an entire broad band desired bandwidth, as may be established with the value, BW SWEEP, centered approximately about an estimated NOMINAL RESONANCE of system 10. Note that an increasing frequency signal as created by the entire pulse train is sometimes referred to as a multi-tone signal. As detailed later, such an approach increases the chances of exciting the system at or near its actual resonance frequency, even though initial that resonance frequency is unknown, and it also results in an improved signal detection in the resultant echo waveform, particularly where correlation is used for one or both of determining the TOF for either the UPS or DNS waveforms, or for determining the delta TOF as between those two.

Having illustrated one approach to providing a multi-tone broad band signal sweep to excite a transducer, note that in an alternative preferred embodiment the manner of creating varying frequency pulses may be adjusted by one skilled in the art. For example, either of the variables PSC of PPS may be adjusted. Indeed, PPS may be set to one, so that the excitation frequency is continuously changed with respect to time, which is sometimes referred to as a chirp signal. As another example, rather than a linear difference between the frequency of successive pulse sets, an exponential difference may be implemented. In general, therefore, the excitation signal may be represented as in the following Equations 2.1 and 2.2:

$$x = \sin\left(2\pi\left(f_1 + \frac{k}{2}t\right)t\right) \quad \text{Equation 2.1}$$

where, $$k = \frac{f_2 - f_1}{T}$$

T is the time it takes to sweep from $f_1$ to $f_2$.

excitation pulse=sign(x)  Equation 2.2

Equation 2.2 is intended to create a square wave, where the pulse goes either positive or negative, based on the sign (i.e., positive or negative) of the value x in Equation 2.1. Thus, as the sinusoid of x from Equation 2.1 rises and falls, at the same frequency so shall the square wave excitation pulse resulting from Equation 2.2. Still further, note that alternative preferred embodiments excite the transducer with transducer excitation waveforms other than a pulse train, that is, other types of signals that are periodic and have a known amplitude and frequency, where such signal is further modified per the preferred embodiments to have a frequency that is changing (i.e., either increasing or decreasing) during the excitation period (e.g., between $t_0$ and $t_1$ in FIG. 2). For example, an alternative excitation waveform could be a continuous sinusoidal signal of a known amplitude and (changing) frequency coming from a resonant circuit. In any event, therefore, the term waveform in the context of transducer excitation preferably includes such other variations, where for a periodic signal the shape of the period is the same during each period, with it understood that such shape is either expanding or contracting in the time dimension with the change of frequency. Lastly, note also that the sequencing of frequency, whether discrete or continuous, may be controlled and implemented in numerous manners. For example, in one approach, the sequencing may be represented by predetermined data that is stored in a table in, or accessible by, processor 14, so as to apply a corresponding frequency-changing excitation signal to transducers $TR_1$ and $TR_2$. In another example, the sequencing may be calculated by processor 14.

Returning to method 30 and its step 42, note the condition of the step is satisfied once all NPS*PPS=44 pulses in a sequence for a transducer $TR_d$ have been transmitted. For example, once the last pulse at frequency $f_{11}$ of the 44 pulses of Table 1 have been transmitted, then step 42 is again reached, and in this instances PSC=NPS=11, so method 30 continues to steps 46 and 48. In step 46, the transducer $TR_{opp}$, meaning the transducer opposite of transducer $TR_d$ in system 10, receives an echo waveform in response to the pulses transmitted by transducer $TR_d$. Thus, when transducer $TR_1$ transmits pulses, then step 46 samples the echo waveform received by transducer $TR_2$, and in opposite fashion, when transducer $TR_2$ transmits pulses, then step 46 samples the echo waveform received by transducer $TR_1$. Thereafter, step 48 determines the absolute $TOF_{d-opp}$ as between the transmitting transducer $TR_d$ and the receiving transducer $TR_{opp}$, where a discussion for a preferred embodiment of such a determination is provided later and, by way of introduction, is preferably achieved by correlating the transmitted waveform with a digital sampling of the received echo waveform. Next, method 30 continues to step 50.

In step 50, a condition is evaluated to determine whether pulse sequences have been transmitted in both the UPS and DNS directions. Specifically, the direction index d is evaluated to determine if it has reached a value of two. If d is less than two, method 30 continues to step 52, where d is incremented and method 30 returns back to step 36, thereby creating an outer loop in method 30. Specifically, step 36 re-establishes $f_{PLS}$ down to the initial frequency used for pulse $f_1$ in FIG. 4, and step 38 re-establishes the pulse set count to a value of 1. Next, the inner loop of method 30 will repeat, but here for transmission in the opposite direction as compared to the previous NPS*PPS pulses that were communicated from one transducer to the other. Thus, where the first set of NPS*PPS pulses are transmitted in a first direction from transducer $TR_1$ to transducer $TR_2$, then a second iteration (i.e., for d=2) causes a second set of NPS*PPS pulses to be transmitted in a second direction from transducer $TR_2$ to transducer $TR_1$, where again each pulse set, after the first pulse set, has a frequency that linearly increases (by $f_{INC}$) from the immediately preceding pulse set. Once the NPS*PPS pulses are thereby transmitted in this second direction, steps 46 and 48 again occur, this time sampling the echo waveform received by transducer $TR_1$ and determining the absolute TOF as between transducer $TR_2$ and transducer $TR_1$. Next, method 30 continues to step 54.

Step 54 determines ΔTOF, that is, the difference in TOF determinations made by the two preceding iterations of step 48, that is, the difference between the UPS and DNS TOF determinations. As detailed below, a preferred embodiment for the step 54 determination correlates the samplings of the received DNS and UPS echo waveforms with each other, where the time shift as between the two represents the delta TOF value. As also later explained, because a multitoned (e.g., chirp) signal is used in creating each of the echo waveforms, a more robust and accurate correlation measure is achieved, thereby improving the accuracy and reliability of the delta TOF. Further in this regard, following step 54, step 56 determines flow velocity v, as preferably achieved by substituting the values of UPS and DNS TOF from step 48, and delta TOF from step 54, into Equation 1. Moreover, as each of those substituted values is improved by the processes described herein, then ultimately so is there an improvement in the step 56 velocity v determination.

FIGS. 5A through 5G illustrate a graphical representation of a correlation process used in a preferred embodiment to accomplish step 48 (and step 54) described above. Recall that step 48 determines absolute TOF, that is, TOF as between a pulse train PT transmitted by one transducer $TR_d$ and its corresponding echo waveform received at the opposing transducer $TR_{opp}$. By way of introduction to these Figures, therefore, the correlation is a time-shifting step-by-step comparison of two signals to one another, where for each step the comparison is at a different time-shifted position as compared to the preceding/following step. Correlation, if reaching the proper and desired result, determines a point in time when the two compared signals are closest/best aligned in time. As demonstrated by the following discussion, such a time may be used as either the completion, or reference, for determining the absolute TOF period. Also relevant to this discussion as a component of TOF is that it is known that some amount of time will be known to elapse as between the time the pulse train PT starts (e.g., $t_0$ in FIG. 2) and the time the echo waveform starts to appear (e.g., $t_2$ in FIG. 2); for sake of discussion, this time is referred to as a preliminary offset time $pt_{ofs}$. As also detailed later, note that correlation may be expressed mathematically in various forms, such as an integration (or dot product) over time of one sample set relative to the other, where a maximum value in the mathematical result provides an indication of best alignment.

Figure 5A:
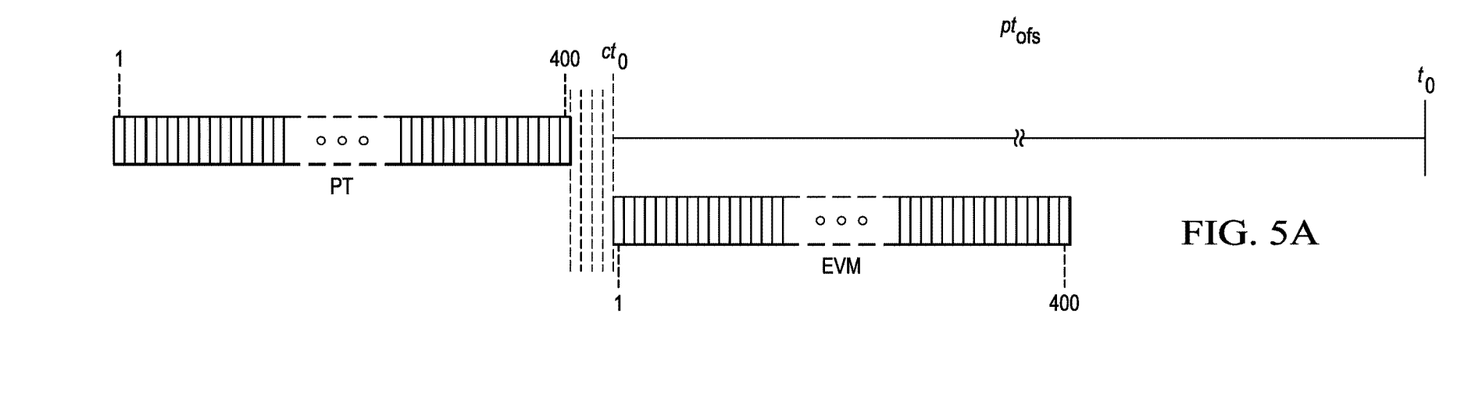
FIGS. 5A through 5G illustrate a digital sample set of the transmitted pulse train PT and a digital sample set of the received echo waveform EVM, with different time shifted correlation measures taken for the differing time-shifted positions of the sets.

Looking first to FIG. 5A, it is intended to illustrate a digital sample set having 400 samples of the transmitted pulse train PT and a digital sample set having 400 samples of the received echo waveform EVM. For references, the first and last sample in each set are numbered 1 and 400 respectively, in these Figures. Note that having the same number of samples is used to simplify the present example, whereas in a preferred embodiment the length (i.e., number of samples) is greater for the echo waveform than for the pulse train. The vertical direction in FIG. 5A is intended to depict a time alignment, as further evident below, whereby a sample in one sample set is correlated with a sample in the other sample set that is in the same vertical time alignment. These same representations occur in the remaining FIGS. 5B through 5G, and in the latter Figures each represents a case where the two sample sets are further time shifted relative to one another, representing different time position comparisons of the sample set as part of the correlation process. Looking in more detail to FIG. 5A, following the preliminary offset time offset $pt_{ofs}$, the PT sample set and the EVM sample set are aligned in a starting correlation time $ct_0$. At this time alignment, a correlation measure is made from each sample set with the sample set aligned in the same vertical position; in FIG. 5A, however, none of the 400 samples in the PT sample set are sample aligned with any of the 400 samples in the EVM sample set. Hence, the mathematic implementation of comparison will yield a zero output (ignoring any noise), as each sample set is compared to a zero entity in the same vertical alignment.

Figure 5B:
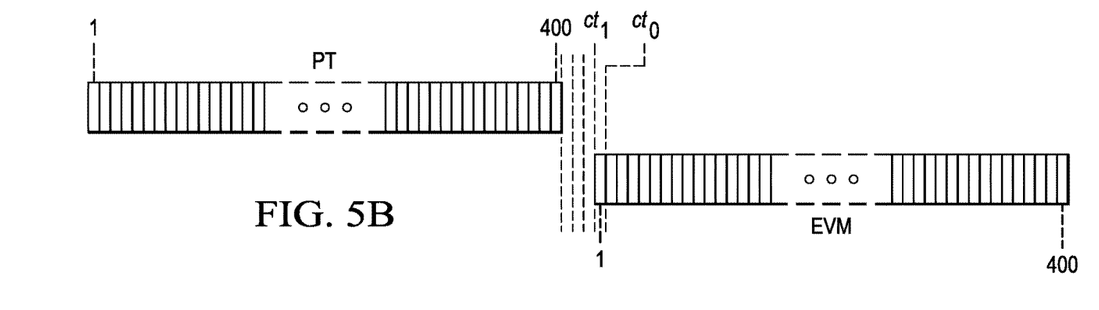

Looking next to FIG. 5B, it represents the sample set EVM shifted one time slot to the left, relative to FIG. 5A, thereby occurring at a sequentially-next correlation time $ct_1$. At this new time alignment, again a correlation measure is made from each sample set with the sample set aligned in the same vertical position; as was the case in FIG. 5A, however, again in FIG. 5B none of the 400 samples in the PT sample set is vertically time aligned with any of the 400 samples in the EVM sample set. Thus, the mathematic comparison will yield a zero output, as again each sample set is compared to a zero entity in the same vertical alignment. Indeed, note that FIG. 5C again illustrates a same result, as FIG. 5C depicts the sample set EVM shifted another single time slot to the left, relative to FIG. 5B, thereby occurring at a sequentially-next correlation time $ct_2$. As with all other instances in the correlation, at a given time alignment, again a correlation measure is made as between the sample sets and data in the same vertically-aligned position, but once more in FIG. 5C none of the 400 samples in the PT sample set is vertically time aligned with any of the 400 samples in the EVM sample set, thereby again yielding a zero output. One skilled in the art will appreciate that this process will repeat for the next two correlation times ($ct_3$ and $ct_4$, not shown), as for those time slots there still will be no time slot overlap as between the two sample sets.

Figure 5C:
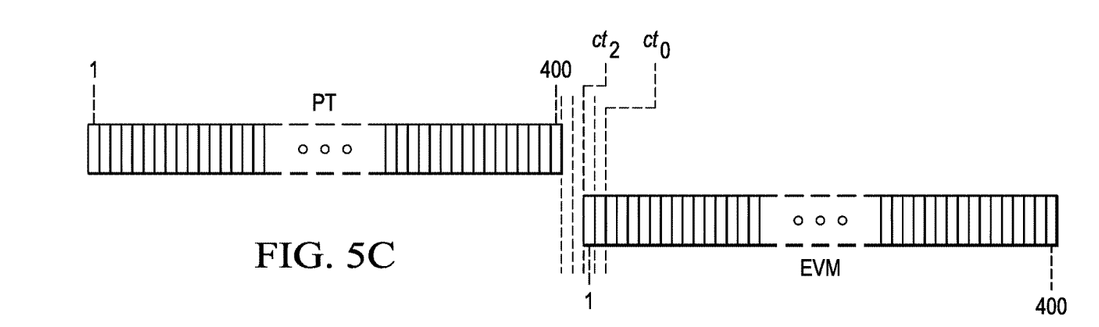
Figure 5D:
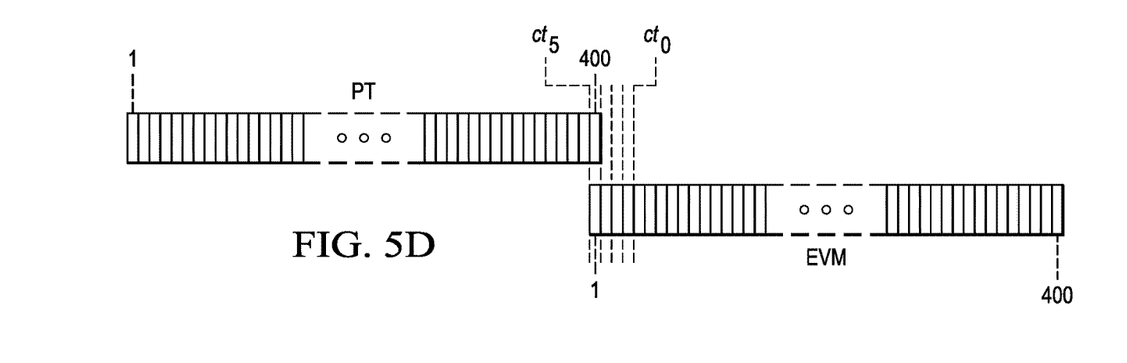

Looking next to FIG. 5D, it represents the sample set EVM shifted three time slots to the left, relative to FIG. 5C, thereby occurring at a correlation time $ct_5$. At this new time alignment, again a correlation measure is made from each sample set with the sample set aligned in the same vertical position; as was the case in the preceding FIGS. 5A-5C. In FIG. 5D, however, note that the first sample in the EVM sample slot (i.e., sample 1) aligns with the last sample in the PT sample set (i.e., sample 400). Thus, the mathematic comparison from the alignment of these single samples will yield an output greater than zero, but inasmuch as the remaining 399 samples of each set are not aligned to a sample in the opposing set, the total correlation result will still be a relatively low number.

Figure 5E:
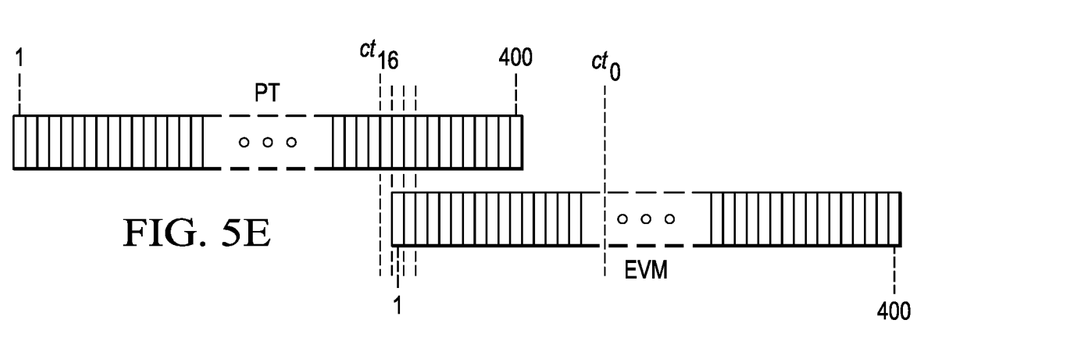
Figure 5F:
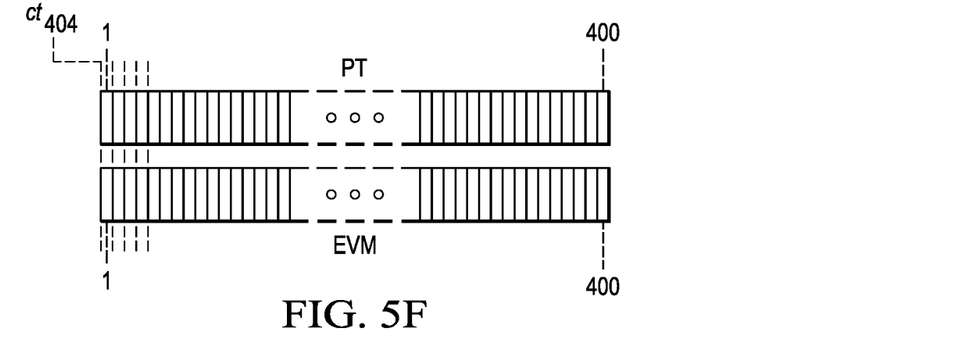
Figure 5G:
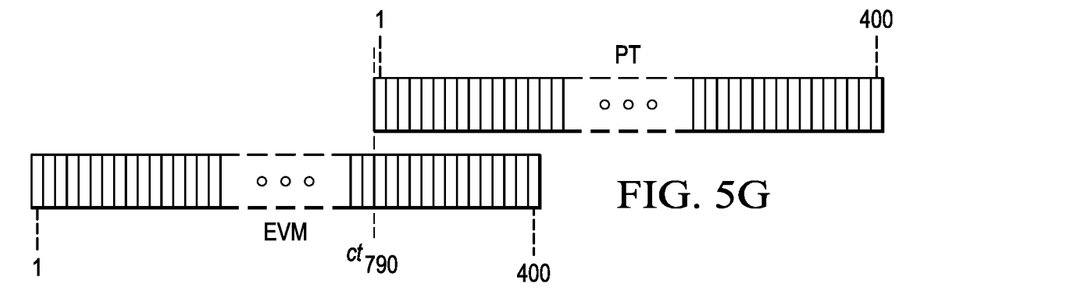

The above single time slot shift and correlation measure continues, as represented in the remaining FIGS. 5E, 5F, and 5G. By way of an arbitrary example, therefore, FIG. 5E represents the sample set EVM sample set shifted fifteen time slots to the left, relative to FIG. 5D, thereby occurring at a correlation time $ct_{16}$, thus, in FIG. 5E, more data samples in the respective sets are aligned into respective time slots, which will result in an increased correlation measure, as compared to FIG. 5D. FIG. 5F represents the EVM sample set shifted numerous additional time slots to the left, relative to FIG. 5E, thereby occurring at a correlation time $ct_{404}$. FIG. 5F, therefore, is intended to illustrate the point in time when the two sample sets are completely aligned. Again for this time slot alignment, a correlation measure is taken, and the resultant value will ultimately prove to be the highest value of all eventually-completed correlation measures. This highest value, therefore, will confirm that the best match occurred at time $ct_{404}$, so the 404 time slots thereby indicated may be added to the preliminary offset time $pt_{ofs}$, thereby providing a total absolute TOF as between the pulse train PT and the resulting echo waveform EVM. Further in this regard, lastly FIG. 5G indicates the ongoing correlation process, as the EVM sample set continues to shift to the left for additional time slots, and at each a correlation measure is obtained so as to fully evaluate the potential time alignments of the two sample sets relative to one another. As the shifting continues in this manner, however, the respective correlation measures will be less than that of the fully aligned samples in FIG. 5F.

Having represented and described correlation in general, note that it may be implemented in various manners as ascertainable by one skilled in the art. In one preferred embodiment the following Equation 3 is used, as may be readily programmed into the operation of processor 14:

$$\text{corr}(k) = \Sigma_{i=1}^{l_2} r_1(i+k) r_2(i) \qquad \text{Equation 3}$$

where,
  $r_1$ is the received (either UPS or DNS) waveform;
  $r_2$ is the reference (either DNS, UPS or TX) waveform;
  $l_1$ is the length (number of samples) in $r_1$;
  $l_2$ is the length (number of samples) in $r_2$; and
  $k=(0 \ldots (l_1-l_2))$, where $l_1 > l_2$).

Having described various preferred embodiment aspects, a key benefit is now observed by returning to FIG. 5F. In FIG. 5F, note that the samples in the pulse train PT sample set necessarily reflect the changing frequency of the chirp signal illustrated in FIG. 4. Somewhere along the changing frequencies of the chirp signal, one frequency will match or most closely approximate the actual resonant frequency of system 10. Thus, even though system 10 has an unknown or changing resonant frequency, the sweeping of various frequencies as shown in FIG. 4 will eventually cause a period in the pulse train to match, or get the closest to, the unknown system resonant frequency. Thus, for the time slot(s) where that frequency occurs, in that time slot, or in one of those time slots if the same frequency occurs in multiple time slots, the EVM sample set will have its largest magnitude, that is, the peak response to the resonant frequency; hence, this may be considered the resonance-occurring time slot. Note further, however, that the sweeping chirp frequency not only ensures a match or near match to the system resonant frequency, but it also improves the determinability of the resonance-occurring time slot. Specifically, with respect to time slots before or after that resonant time slot, as the exciting frequency in each of those slots moves away from the resonant frequency, then the EVM response will immediately start to reduce as compared to the EVM response in the resonance-occurring time slot. Indeed because the preferred embodiment uses the multi-toned (e.g., chirp) pulse train, that reduction will occur not only in the EVM signal, but likewise it also will appear in the correlation measures, that is, the correlation for the resonance-occurring time slot peak will be readily higher than the next highest peaks around it. Thus, correlating to the resonance-occurring time slot should be readily resolvable per the preferred embodiments, so that only a single peak is determined in the correlation, thereby increasing the accuracy of the correlation. A more accurate correlation in turn provides a corresponding accuracy in the determination of the proper resonance-occurring time slot. As introduced earlier, therefore, the timing of the resonance-occurring time slot is then readily added to the preliminary offset time $pt_{ofs}$, thereby providing the absolute TOF in the direction being analyzed.

Also in a preferred embodiment, the method illustrated in FIGS. 5A through 5G, and the evaluation of Equation 3, are used to determine the relative TOF, that is, delta TOF is determinable by correlating the UPS and DNS echo waveforms. Thus, in this case, $r_1$ is one of the UPS or DNS echo waveforms, while $r_2$ is the other of those echo waveforms. In other words, as those waveforms will be similar as part of the same overall system response, then correlating them with one another will determine the difference in time as between the occurrence of one and the other—hence, delta TOF.

Figure 6:
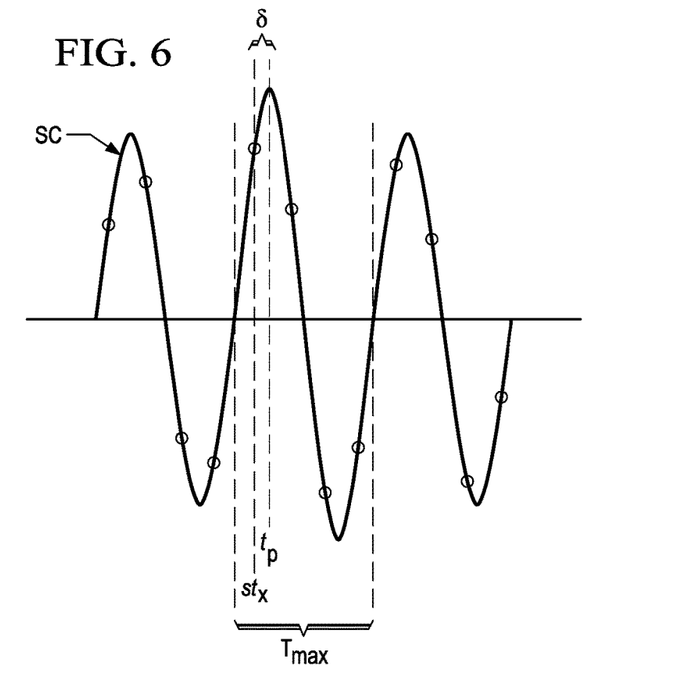
FIG. 6 illustrates a generally sinusoidal curve SC as a depiction of an analog correlation between the UPS and DNS waveforms.

As a further refinement to the preceding, it is noted that correlation of the UPS and DNS echo waveforms, particularly due to the use of the multi-tone excitation signals, is well-suited to identify the particular time slot during which the DNS and UPS waveforms are most closely aligned, as the amplitude of the correlation signal during that time slot should be considerably larger than that of the amplitude in the adjacent time slots. However, within that single time slot, recall that multiple samples have been taken, as the sampling rate is a multiple of the approximate resonance frequency. In this regard, therefore, FIG. 6 illustrates a generally sinusoidal curve SC (shown in dotted line) as a depiction of an analog correlation between the UPS and DNS waveforms. However, in the preferred embodiment, digital sampling and correlation of those samples are implemented, so circles along curve SC represent the samples used in the correlation, where assume for sake of example that the sampling rate is approximately four times the frequency of the waveform, so each illustrated waveform period includes four samples (i.e., four circles). Further, curve SC has a peak amplitude at a time $t_p$ during a period, $T_{max}$, so that the peak correlation therefore occurs during $T_{max}$. Note, however, that peak time, $t_p$, is at a distance, $\delta$, from the nearest sample time $st_x$. Thus, the preferred embodiment determined delta TOF not solely from $T_{max}$, but also from the offset of the distance, $\delta$ from the peak time, $t_p$. To achieve this step, the preferred embodiment performs a three point correlation and an interpolation of points during $T_{max}$, such as a cosine interpolation, so as to approximate curve SC and thereby determine the peak time, $t_p$, thereby further establishing the distance, $\delta$, to the nearest sample time. For example, such a correlation and an interpolation may be evaluated from three samples (and their respective sample times) that occur during $T_{max}$, as shown in the following Equations 4, 5, 6, 7, and 8:

$$\text{corr}(k) = \Sigma_{i=1}^{N-k} r_1(i+k) r_2(i) \qquad \text{Equation 4}$$

where,
  $r_1$ is the received (either UPS or DNS) waveform;
  $r_2$ is the received (either DNS or UPS) waveform;
  N is the length of the UPS and DNS waveforms; and
  k is the offset between the UPS and DNS waveforms.

Equation 4 provides the correlation in the following Equation 5, so as to provide the three samples, $Z_{-1}$, $Z_0$, and $Z_1$, as further described below:

$$Z_n = corr(\hat{k} - n) \quad \text{Equation 5}$$

where, $$n = (-1, 0, 1)$$

$$\omega = \cos^{-1}\left(\frac{(Z_{-1} + Z_1)}{2 * Z_0}\right) \quad \text{Equation 6}$$

$$\varphi = \tan^{-1}\left(\frac{(Z_{-1} + Z_1)}{2 * Z_0 * \sin(\omega)}\right) \quad \text{Equation 7}$$

$$\delta = \frac{-\varphi}{\omega} \quad \text{Equation 8}$$

where, $Z_0$ is the sample closest to $t_p$;

$Z_{-1}$ is the sample immediately before $Z_0$; and $Z_1$ is the sample after $Z_0$.

The above-described correlation based methodology accounts for sample slips within a cycle (e.g., $T_{max}$) by ensuring $Z_0$ is always greater than $Z_{-1}$ and $Z_{+1}$. If $Z_0$ is not greater than $Z_{-1}$ and $Z_{+1}$ then "n" in Equation 5 can be moved on either direction (−2, −1, 0) or (0, 1, 2) until the condition is satisfied. It is to be noted that delta TOF can be greater than a cycle at high flows, in which case a correlation-based technique cannot correct for a cycle slip. This situation is dependent on the resolvability between the correlation peak and the next highest peaks around it. Hence, the ratio between the correlation peak and the neighboring peak can be used as a measure to evaluate the performance of different excitation pulse techniques, where in the preferred embodiment the use of a multi-tone signal has been found to be very robust and immune to channel affecting issues (e.g., temperature, change in medium) and noise, so as to mitigate the possibility of sample slips and permit the use of the correlation-based technique.

Figure 7:
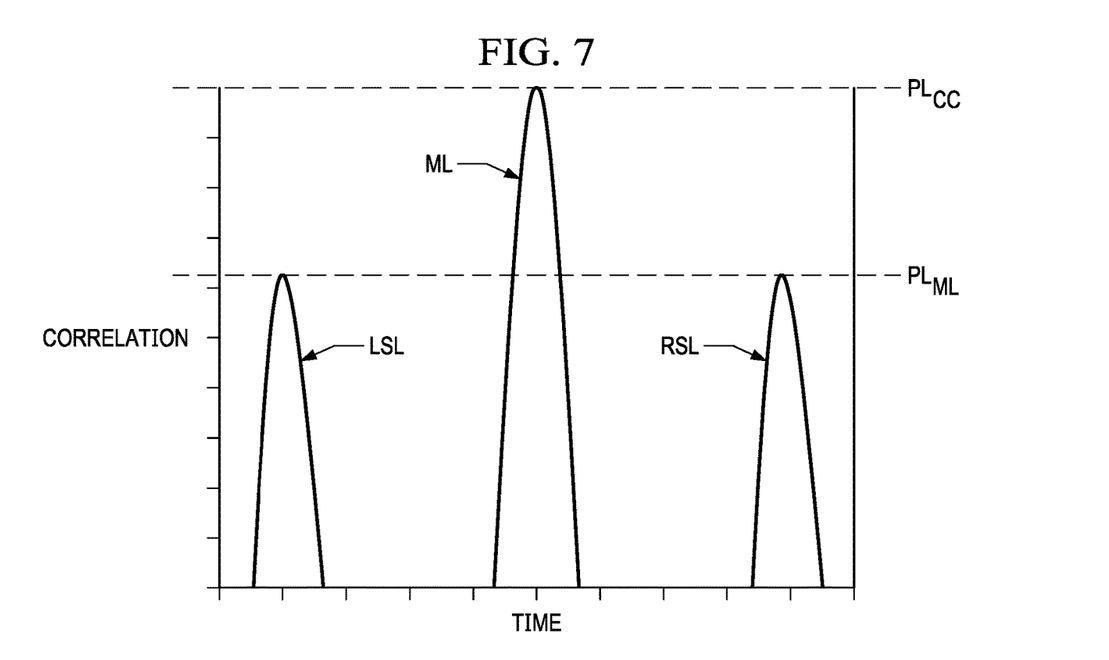
FIG. 7 illustrates a partial plot of three cycles from a correlation of UPS and DNS waveforms, where the illustrated partial plots show a main lobe ML, a left side lobe LSL and a right side lobe RSL.

Further in regard to the preceding, FIG. 7 illustrates a partial plot of three cycles from a correlation of UPS and DNS waveforms as described above, where the illustrated partial plots show a main lobe ML, a left side lobe LSL and a right side lobe RSL. The main lobe ML has a peak at line $PL_{ML}$, which is readily discernable as distinguishably greater than the side lobe peak line $PL_{SL}$ that exists for the side lobes LSL and RSL, whichever is higher. Thus, the preferred embodiment manner of frequency sweeping across a certain bandwidth creates a response in the TOF correlation that renders the peak correlation magnitude detectable with less chance of cycle slip, as compared to inadvertently mistaking a side lobe peak as the maximum correlation peak as could occur if a side lobe is close to the amplitude of the center cycle, in which case then the system could confuse the main lobe to be either of the side lobes and thereby causing a cycle slip. Indeed, the ratio between the correlation peak at the main lobe ML and the neighboring peaks to either side (i.e., side lobes LSL and RSL, whichever is greater) can be used as a measure to evaluate the performance of different excitation pulse techniques. Moreover, the ratio also may indicate a benefit in adjusting transmit power so as to improve the ratio, as the ratio provides a measure whether the transmit scheme has provided the needed discernibility in the received signal. The ratio also provides a measure of confidence in the computed TOF. Further in this regard, the following Table 2 depicts in each of its numbered rows an example of excitation of a transducer, where rows 1 and 2 illustrate a prior art single frequency transducer excitation, while rows 3-11 illustrate a preferred embodiment chirp excitation, at the listed center frequency and bandwidth sweep about the center, in respective frequencies. The last column, for each row, lists the ratio between the magnitude of the main lobe ML and the largest side lobe magnitude, which is commonly referred to as the peak to side lobe ratio. Note in this regard, therefore, that row 5 of the Table 2 illustrates a relatively large variation, particularly as compared to the single tone examples in rows 1 and 2 of the Table. Thus, the preferred embodiments demonstrate ample improvement in peak correlation detection, thereby reducing cycle slip and improving the related TOF determination.

TABLE 2

| | Input | | | Peak to Side Lobe Ratio (dB) Raw signal (approx. 800 |
|---|---|---|---|---|
| Row | Tone | Freq (KHz) | Pulses | codes) |
| 1 | Single | 160 | 40 | 0.069 |
| 2 | Single | 200 | 40 | 0.097 |
| 3 | Chirp | 160, BW20 KHz | 40 | 0.153 |
| 4 | Chirp | 160, BW40 KHz | 40 | 0.497 |
| 5 | Chirp | 160, BW80 KHz | 40 | 1.830 |
| 6 | Chirp | 180, BW20 KHz | 40 | 0.160 |
| 7 | Chirp | 180, BW40 KHz | 40 | 0.488 |
| 8 | Chirp | 180, BW80 KHz | 40 | 1.547 |
| 9 | Chirp | 180, BW20 KHz | 40 | 0.171 |
| 10 | Chirp | 180, BW40 KHz | 40 | 0.330 |
| 11 | Chirp | 180, BW80 KHz | 40 | 0.895 |

Indeed, each of the chip tone excitations yields an improved result over the single frequency excitation approach, with various degrees of improvement as shown in Rows 3-11 of Table 2. Lastly, while the preceding has been described with respect to delta TOF, note that the same preferred embodiment aspects also may be applied to absolute TOF.

In another aspect of a preferred embodiment, with correlation implemented in determining absolute and differential TOF, a search and track approach is implemented to improve efficiency by reducing the number of correlation operations performed over time. Specifically, returning to the example of FIGS. 5A through 5G, in that approach, wherein each sample set included 440 samples, then a first total of 880 correlation measures are taken, so as to compare the two sets relative to one another at each relative possible time slot combination. This approach is referred to as a search correlation. Once the TOF is so determined (either absolute or differential), however, efficiency is further achieved by reducing the number of time slot positions that are evaluated, for subsequent instances when TOF is later determined for subsequent measures. For example, for such subsequent correlation measure, a second total of only ±N (e.g., N=30) time slots around the earlier determined peak time may be evaluated, with there being therefore a strong likelihood that the maximum peak will fall within those second total of time slots. This approach is referred to as a track correlation. Thus, the initial search correlation is later followed by the track correlation. Note further that various criteria may be implemented which, if satisfied, returns the correlation methodology back from track correlation (i.e., limited sample slots) to search correlation (i.e., all sample slots in a sample set). For example, if a peak magnitude found using track correlation is sufficiently different (e.g., by some percentage) from the peak magnitude found prior using a search correlation, then the method can revert back to a search correlation. As another example, time may be a criterion, whereby a search correlation is first performed, and thereafter for a period of time all subsequent correlations are track correlations until the time elapses, whereupon again the correlation reverts to a search correlation and so forth for like subsequent time periods.

Figure 8:
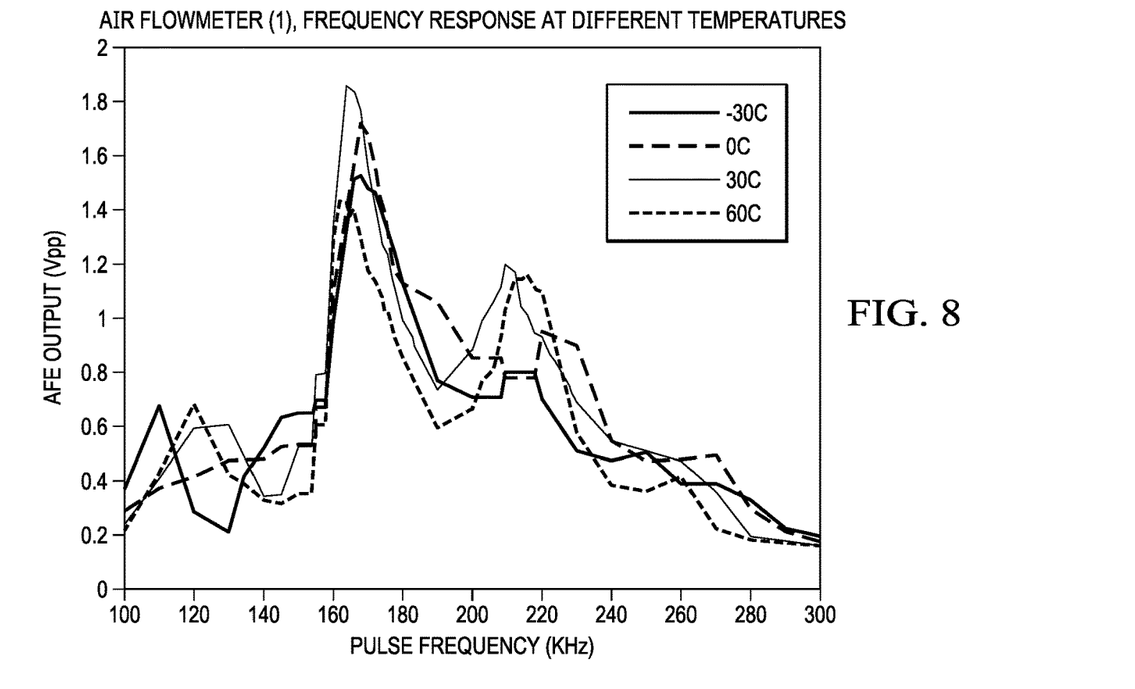
FIG. 8 illustrates four frequency response plots for a first flowmeter system such as system 10 in FIG. 1, where each plot corresponds to a different temperature.
Figure 9:
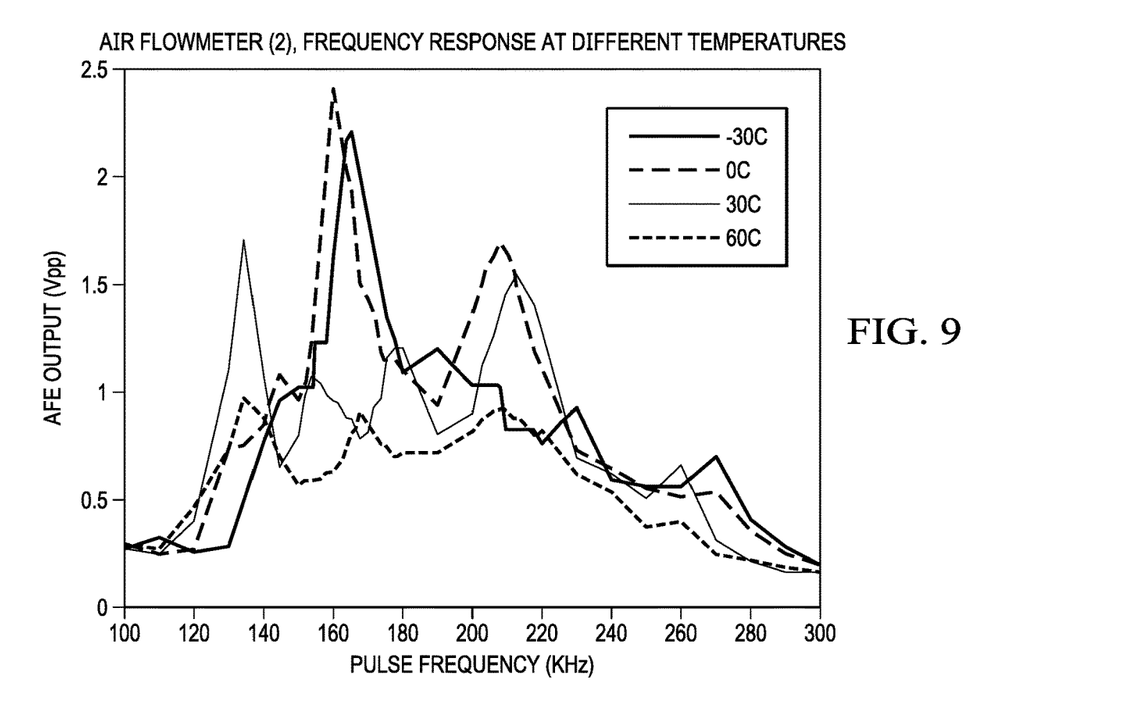
FIG. 9 illustrates four frequency response plots for a second flowmeter system such as system 10 in FIG. 1, where each plot corresponds to a different temperature.

Given the preceding, note that a preferred embodiment method 30 applies an excitation signal to a transducer system in a manner that sweeps, such as via a chirp signal, across a broad band range of frequencies, thereby also facilitating a sufficient resonance response in a transducer system that is well detected using correlation for absolute and delta TOF. Note, therefore, that the preferred embodiment is effective, for example, in a transducer system that has either an unknown or changing system response. For example, FIG. 8 illustrates four frequency response plots for a single flowmeter system such as system 10 in FIG. 1, where each plot corresponds to frequency response at a different respective temperature. Frequency is shown along the horizontal axis and detected amplitude response along the vertical axis. For the given system, therefore, it may be seen that for all four plots, a first peak, suggesting a first frequency of resonance, occurs as the frequency sweeps in the range of 160 to 170 kHz. For the same system, a second frequency of resonance, occurs as the frequency sweeps in the range of 210 to 220 kHz. The preferred embodiment chirp signal, therefore, will allow this system to be excited at either (or both) such frequencies, thereby providing the opportunity of proper TOF measurement at such frequencies. Further in this regard, FIG. 9 illustrates a comparable set of four plots also for a single flowmeter system such as system 10 in FIG. 1, but where the transducers have been replaced with another set of transducers, from a same manufacturer. By comparing FIG. 9 to FIG. 8, however, note that the location of peaks (i.e., the frequency response) can change considerably, even among different devices from a same manufacturer and the variation across temperature is also different. Thus, if under the prior art a single excitation frequency were used directed at a system with a response as shown in FIG. 8, that same frequency would be less ideal if used for a system with a response as shown in FIG. 9. In contrast, with the preferred embodiment sweep across a bandwidth of frequencies, the preferred embodiment is equally able to properly and efficiently excite the systems of either FIG. 8 or FIG. 9. Moreover, method 30 may be repeated at various intervals, based on a change of condition, where such a condition can be time, environmental (e.g., temperature), or still others. As a result, in response to changes in the field once a system 10 is implemented, the preferred embodiment sweep will still encompass a frequency (or frequencies) that will maximally excite the system and produce a measurable and accurate response, so as to adopt to changes in the field, without undue manual testing or the rigidity of a single excitation frequency.

From the above, the preferred embodiments are shown to provide a transducer system and method using broad band excitation pulse frequencies for such transducers. The preferred embodiment also may use correlation for TOF measures, further enhanced by the use of the broad band excitation. The preferred embodiments, as a result, provide numerous advantages over the prior art. For example, the preferred embodiments have been empirically shown to provide accurate TOF measures even in noisy environments (i.e., relatively low signal-to-nose ratio (SNR)), with a strong improvement in reducing cycle slips as compared to a single frequency excitation system. Likewise, the preferred embodiments have been empirically shown to provide accurate TOF measures in attenuating media (e.g., methane), also with a strong improvement in reducing cycle slips as compared to a single frequency excitation system. As another example, the preferred embodiments are useful for transducer systems with unknown or changing resonance structure as long as the frequency variation is within the chirp frequency range, as the chirp tone will cause an efficient response regardless of the unknown or unknowability of actual resonant frequency, including if that frequency changes over time, temperature, or other condition. As another example, as long as the system has a wide bandwidth, the preferred embodiment eliminates the need for calibrating the excitation pulse sequence or searching for an excitation frequency at the manufacturer's site, hence significantly reducing calibration overhead. As another result, therefore, real-time in the field calibration (either automatically or manually) is eliminated. As yet another example, even if multiple flowmeters do not have similar frequency responses, the preferred embodiment works similarly on all the flowmeters, hence benefiting the manufacturer by significantly reducing the calibration time. As yet another example, cycle slip issues are also reduced by the preferred embodiment, in response to a bigger correlation peak difference and using the difference in absolute TOF to shift either the upstream or downstream data before computing delta TOF, while the number of correlation computations may be reduced using the search and track aspects of the preferred embodiment, thereby improving the processing demands. Further, the preferred embodiments have been shown in a favorable implementation with respect to flow meters, but note numerous aspects may apply to other systems. For example, preferred embodiment aspects may be applied to transducer applications other than flow meters. As another example, the preferred embodiment is shown by example in a system with two transducers, but various aspects also may be applied to a single transducer, wherein it is excited with a frequency and transmits a pulse train, after which it then responds to the reflection of that pulse train. In view of the above, therefore, while various alternatives have been provided according to the disclosed embodiments, still others are contemplated and yet others can be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A method comprising:
    applying a first excitation waveform during a first excitation period, the first excitation waveform comprising a plurality of periodic cycles with changing frequency to excite a first transducer;
    receiving a first echo waveform in response to the excitation of the first transducer;
    performing a first correlation between the first echo waveform and a reference waveform to determine a first correlation result, wherein performing the first correlation comprises evaluating a first number of time slots;
    determining a first absolute time of flight between the first excitation waveform and the first echo waveform based on the first correlation;

applying a second excitation waveform during a second excitation period, the second excitation waveform comprising a plurality of periodic cycles with changing frequency;

receiving a second echo waveform after applying the second excitation waveform;

performing a second correlation between the second echo waveform and the reference waveform to determine a second correlation result, wherein performing the second correlation comprises evaluating a second number of time slots that is smaller than the first number of time slots; and determining a second absolute time of flight between the second excitation waveform and the second echo waveform based on the second correlation.

2. The method of claim 1, wherein applying the first excitation waveform comprises applying a first pulse train comprising a first plurality of sets of pulses to excite the first transducer and changing a respective frequency for each set of pulses in the first plurality of sets.

3. The method of claim 2, wherein the changing frequency is such that each set of pulses in the first plurality of sets provides a chirp signal in the first pulse train.

4. The method of claim 2, wherein the changing frequency is such that a respective frequency for each set of pulses in the first plurality of sets changes linearly.

5. The method of claim 2, wherein the changing frequency is such that a respective frequency for each set of pulses in the first plurality of sets changes exponentially.

6. The method of claim 1, wherein the first excitation waveform comprises a signal that is periodic with a changing frequency.

7. The method of claim 1, wherein the first excitation waveform comprises a continuous sinusoidal signal.

8. The method of claim 1, wherein applying the second excitation waveform comprises applying the second excitation waveform to excite a second transducer, and wherein receiving the second echo waveform comprises receiving the second echo waveform in response to the excitation of the second transducer.

9. The method of claim 1, further comprising determining a difference between the first absolute time of flight and the second absolute time of flight.

10. The method of claim 1, wherein the second number of time slots is determined based on the first correlation result.

11. The method of claim 2, wherein the first transducer produces a first transmitted signal in response to the first pulse train, and wherein the step of receiving the first echo waveform comprises receiving the first echo waveform from a second transducer.

12. The method of claim 11, wherein:
applying the second excitation waveform comprises applying a second pulse train comprising a second plurality of sets of pulses to excite the second transducer, wherein the second transducer produces a second transmitted signal in response to the second pulse train, the step of applying a second pulse train comprising changing a respective frequency for each set of pulses in the second plurality of sets; and
the first transducer produces the second received echo waveform in response to the second transmitted signal.

13. A method comprising:
applying a first pulse train comprising a first plurality of sets of pulses to excite a first transducer, changing a respective frequency for each set of pulses in the first plurality of sets;

receiving a first echo waveform from a second transducer in response to the excitation of the first transducer;

determining a first absolute time of flight based on the first pulse train and the first echo waveform;

applying a second pulse train comprising a second plurality of sets of pulses to excite the second transducer;

determining a second absolute time of flight based on the second pulse train and the second received echo waveform; and determining a relative time of flight between the first received echo waveform and the second received echo waveform.

14. A method comprising:
applying a first excitation waveform during a first excitation period, the first excitation waveform comprising a plurality of periodic cycles with changing frequency to excite a first transducer;

receiving a first echo waveform in response to the excitation of the first transducer; and determining a first absolute time of flight between the first excitation waveform and the first echo waveform; and adjusting a transmission parameter in response to a peak to side lobe measure.

15. The method of claim 14, wherein determining the first absolute time of flight comprises measuring a plurality of correlation measures between a first pulse train and the first echo waveform.

16. The method of claim 13, wherein determining the first absolute time of flight comprises:
measuring a first plurality of correlation measures between a first instance of the first pulse train and a first portion of the first echo waveform; and
measuring a second plurality of correlation measures between a second instance of the first pulse train and a second portion of the first echo waveform, wherein the second plurality of correlation measures is lesser than the first plurality of correlation measures.

17. A method, comprising:
determining a nominal resonance frequency value;
determining a bandwidth value;
determining a set of frequencies within the bandwidth value around the nominal resonance frequency value; and
for each frequency of the set of frequencies, exciting a first ultrasound transducer by applying a respective pulse train having the respective frequency;
receiving a first set of reflections in response to the excitation of the first ultrasound transducer;
performing a first correlation between the first set of reflections and a reference waveform to determine a first correlation result, wherein performing the first correlation comprises evaluating a first number of time slots;
for each frequency of the set of frequencies, exciting a second ultrasound transducer by applying a respective pulse train having the respective frequency;
receiving a second set of reflections in response to the excitation of the second ultrasound transducer;
performing a second correlation between the second set of reflections and the reference waveform to determine a second correlation result, wherein performing the second correlation comprises evaluating a second number of time slots that is smaller than the first number of time slots; and
determining a distance measurement based on the first set of reflections the second set of reflections, the first correlation result, and the second correlation result.

18. The method of claim 17, wherein the set of frequencies increases in frequency linearly.

19. The method of claim 17, wherein the set of frequencies increases in frequency exponentially.

20. The method of claim 17, wherein each respective pulse train of the set of frequencies has a same number of pulses.

21. The method of claim 17, wherein:
   determining the distance measurement includes receiving a representation of the set of reflections from the second ultrasound transducer that is different from the first ultrasound transducer.

22. The method of claim 17, further comprising determining a velocity of flow based on the first set of reflections.

* * * * *